United States Patent
Park et al.

(10) Patent No.: US 9,182,896 B2
(45) Date of Patent: Nov. 10, 2015

(54) TERMINAL AND METHOD OF CONTROL

(75) Inventors: Jae Pil Park, Seoul (KR); Hye Bong Lim, Gyeonggi-do (KR); Byoung Pyo Moon, Gyeonggi-do (KR)

(73) Assignee: LG ELECTRONICS INC., Seoul (KR)

( * ) Notice: Subject to any disclaimer, the term of this patent is extended or adjusted under 35 U.S.C. 154(b) by 817 days.

(21) Appl. No.: 12/436,734

(22) Filed: May 6, 2009

(65) Prior Publication Data
US 2009/0292990 A1 Nov. 26, 2009

(30) Foreign Application Priority Data
May 23, 2008 (KR) .................. 10-2008-0048050

(51) Int. Cl.
G06F 3/01 (2006.01)
G06F 3/0485 (2013.01)

(52) U.S. Cl.
CPC .............. G06F 3/0485 (2013.01); G06F 3/016 (2013.01)

(58) Field of Classification Search
CPC ............................... G06F 3/0485; G06F 3/016
USPC ................................................ 715/702
See application file for complete search history.

(56) References Cited

U.S. PATENT DOCUMENTS

| 6,677,965 B1 * | 1/2004 | Ullmann | ............. G06F 3/04812 715/786 |
| 7,822,443 B2 * | 10/2010 | Kim | ...................... G06F 3/0485 345/173 |
| 2006/0020882 A1 * | 1/2006 | Beezer | .................. G06F 17/241 715/232 |
| 2006/0192776 A1 * | 8/2006 | Nomura | ............. H04N 13/0022 345/419 |
| 2008/0190266 A1 * | 8/2008 | Kim | ...................... G06F 3/0488 84/602 |
| 2009/0158186 A1 * | 6/2009 | Bonev | .................. G06Q 30/00 715/769 |

FOREIGN PATENT DOCUMENTS

| JP | 11-154075 | 6/1999 |
| JP | 2006-226820 | 8/2006 |

OTHER PUBLICATIONS

U.S. Appl. No. 61/009,625, filed Dec. 31, 2007 of United States Patent Application Publication No. 2009/0167509 published Jul. 2, 2009.*
Wikipedia.com, "Haptic technology," Dec. 2007, 5 pages.*
Greatis.com, "Win Dowse," Feb. 2006, 1 page.*

* cited by examiner

*Primary Examiner* — Anil Bhargava
(74) *Attorney, Agent, or Firm* — Lee, Hong, Degerman, Kang & Waimey

(57) ABSTRACT

A terminal having a touch screen includes a vibrator configured to provide feedback of a vibration of varying amplitude or frequency when a list is scrolled. The vibration varies as the position of a displayed portion of a list is scrolled using a scroll bar. A unique vibration pattern may be generated when the scrolled list reaches one end, or when a file having a unique attribute is highlighted. A portion of a webpage may be displayed, and the portion of the webpage may be adjusted by scrolling the webpage. When a webpage object is scrolled to a particular location on the display, the terminal may generate a vibration indicating the presence of the webpage object. The terminal may also provide vibration feedback when a progress bar of a reproduced multimedia file is manipulated or when a magnification factor of a displayed image is changed.

26 Claims, 19 Drawing Sheets

(15-1)  (15-2)

FIG. 16
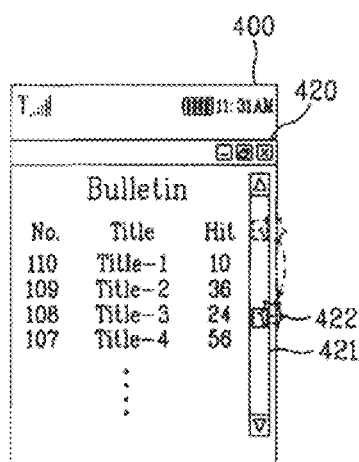
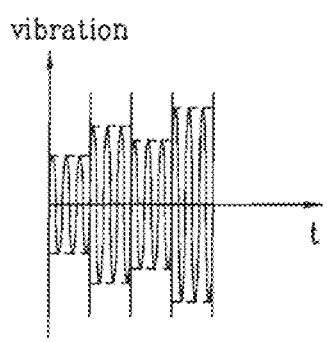

FIG. 19
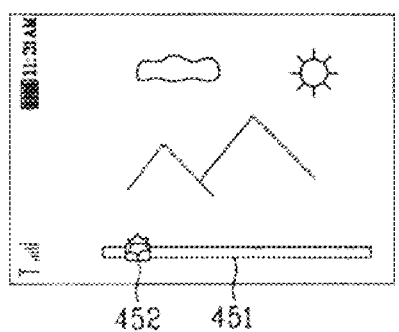
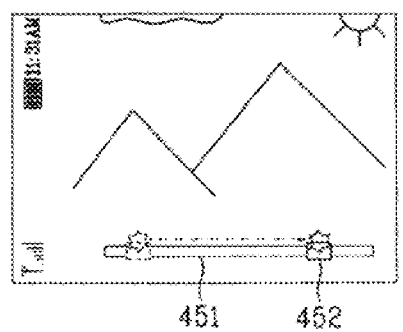
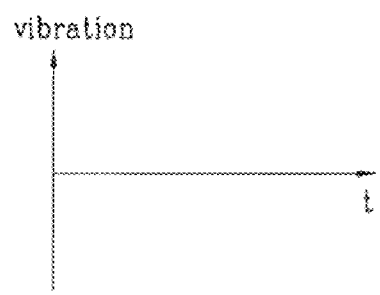
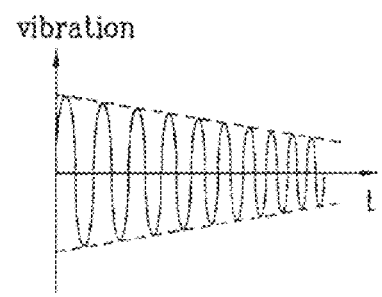
(19-1)　　　　　　　　　　(19-2)

TERMINAL AND METHOD OF CONTROL

CROSS REFERENCE TO RELATED APPLICATIONS

Pursuant to 35 U.S.C. §119(a), this application claims the benefit of earlier filing date and right of priority to Korean Application No. 10-2008-0048050 filed on May 23, 2008, the contents of which are hereby incorporated by reference in their entirety.

FIELD OF THE APPLICATION

The present invention relates to a terminal, and more particularly, to a terminal and method of control. Although the present invention is suitable for a wide scope of applications, it is particularly suitable for conveniently implementing various functions within the terminal.

DISCUSSION OF THE RELATED ART

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit content viewing, such as videos and television programs.

Generally, terminals may be classified as mobile terminals and stationary terminals depending on their portability. Mobile terminals may be further classified as handheld terminals and vehicle mount terminals.

Software and hardware improvements are continually being made to increase the functionality of mobile terminals, as well as changes to the structural components forming the mobile terminal itself. Touch screens have recently been introduced to the mobile terminal market. Commands may be entered into a terminal by touching the terminal with a finger or a stylus. Accordingly, there is a demand for recognizing that the command is correctly entered using the touch screen.

SUMMARY OF THE INVENTION

Accordingly, the present invention is directed to a terminal that substantially obviates one or more problems due to limitations and disadvantages of the related art.

An object of the present invention is to provide a terminal such that when a prescribed command is entered to the terminal through a touch screen, the entering of the correct command may be recognized by a vibration feedback.

Additional advantages, objects, and features of the invention will be set forth in part in the description which follows and in part will become apparent to those having ordinary skill in the art upon examination of the following or may be learned from practice of the invention. Objectives and other advantages of the invention may be realized and attained by the structure particularly pointed out in the written description and claims hereof as well as the appended drawings.

To achieve these objects and other advantages and in accordance with the purpose of the invention, as embodied and broadly described, a terminal includes a touch screen display unit configured to display a portion of a list of items, a vibrator configured to generate vibration feedback responsive to a position of the displayed portion of items within the list of items, and a controller configured to adjust the vibration feedback when the position of the displayed portion of the list of items is changed. The position of the displayed portion of the list is responsive to a scroll bar displayed on the display unit when the scroll bar is touched and dragged within a scroll area.

In another aspect of the present invention, a terminal comprises a wireless communication unit, a touch screen display unit configured to display a portion of a list of items, a vibrator configured to generate a vibration feedback responsive to a selection of one of the items, and a controller configured to vary the vibration feedback according to the selected one of the list of items. Each item of the list of items is associated with a different vibration feedback.

In yet another aspect of the present invention, a terminal comprises a wireless communication unit configured to receive information from the Internet, a display unit configured to display a portion of a webpage received from the Internet, a vibrator configured to generate a vibration feedback responsive to the displayed portion of the webpage, and a controller configured to adjust the vibration feedback when the position of the displayed portion of the webpage is changed. The position of the displayed portion of the webpage is responsive to a scroll bar displayed on the display unit when the scroll bar is touched and dragged within a scroll area.

In still another aspect of the present invention, a terminal comprises a touch screen display unit configured to display a control panel of a multimedia player, a vibrator configured to generate a vibration feedback responsive to the starting point of the multimedia file, and a controller configured to adjust the vibration feedback responsive to the position of the starting point of the multimedia file. The control panel comprises a scroll bar in a scroll area to indicate progress of a reproduced multimedia file. The scroll bar may be touched and dragged to a position indicating a starting point for the reproduction of the multimedia file.

In still yet another aspect of the present invention, a terminal comprises a touch screen display unit configured to display an image, a vibrator configured to generate a vibration feedback responsive to the magnification factor, and a controller configured to adjust the vibration feedback responsive to the magnification factor. The image also includes a scroll bar in a scroll area to indicate a magnification factor of the image. The scroll bar may be touched and dragged to adjust the magnification factor of the image.

It is to be understood that both the foregoing general description and the following detailed description of the present invention are exemplary and explanatory, and are intended to provide further explanation of the invention as claimed.

BRIEF DESCRIPTION OF THE DRAWINGS

The invention will be described in detail with reference to the following drawings in which like numerals refer to like elements. The accompany drawings, which are included to provide a further understanding of the invention and are incorporated in and constitute a part of this specification, illustrate embodiments of the invention and together with the description serve to explain the principles of the invention.

FIGS. 14 to 19 are display screens of a mobile terminal having a fourth embodiment of the present invention.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

A mobile terminal according to the present invention is described in detail with reference to the drawings. In the following description, suffixes "module" and "unit" of constituent elements are provided for easily describing a specification, instead of having a distinctive meaning or function.

The mobile terminal described in the specification may include a cellular phone, a smart phone, a laptop computer, a digital broadcast terminal, personal digital assistants (PDA), a portable multimedia player (PMP), a navigation system and so on.

Figure 1:
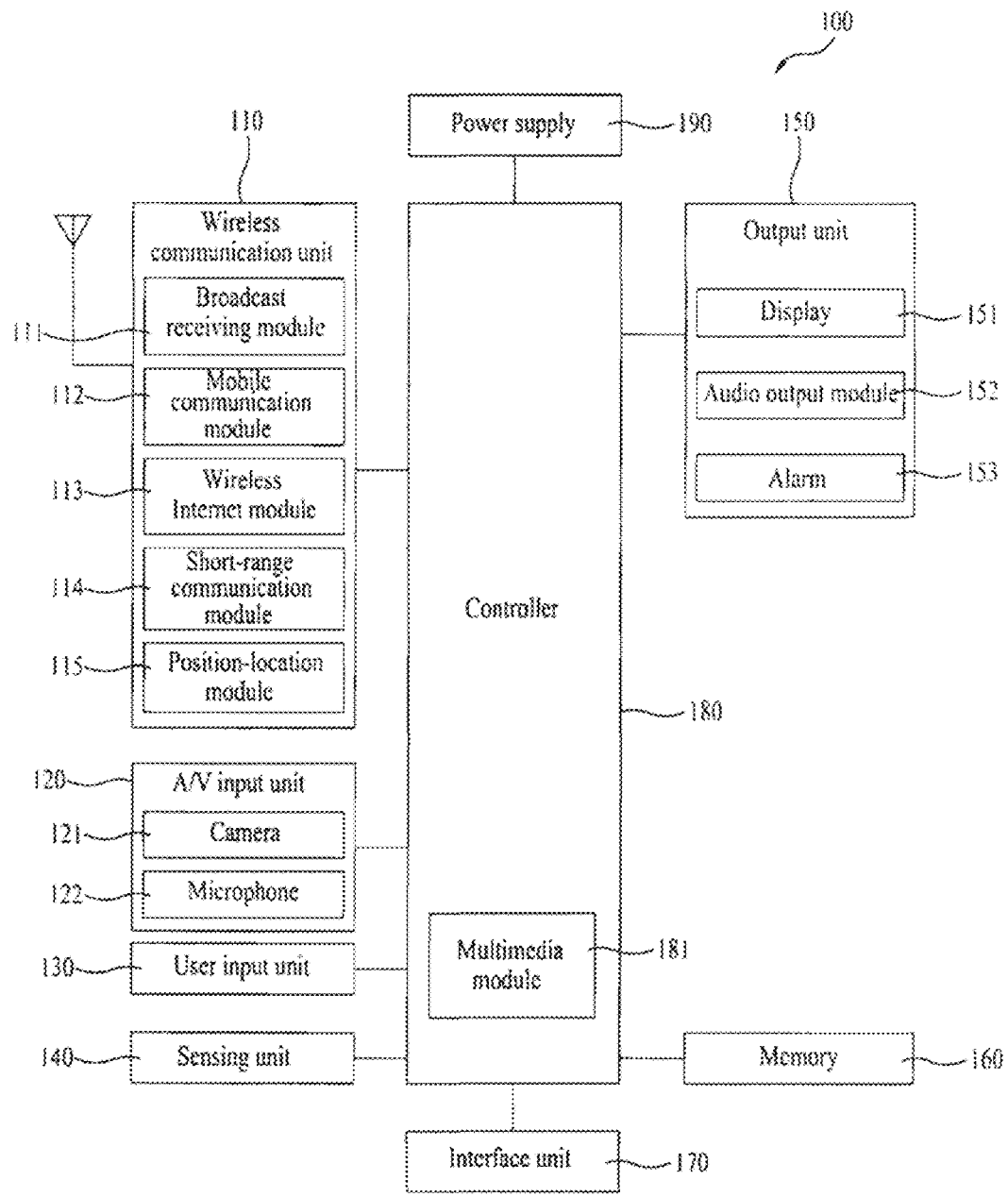
FIG. 1 is a block diagram of a mobile terminal in accordance with one embodiment of the present invention.

FIG. 1 is a block diagram of a mobile terminal 100 in accordance with an embodiment of the present invention. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located. In case of non-mobile terminals, the wireless communication unit 110 may be replaced with a wire communication unit. The wireless communication unit 110 and wire communication unit may be commonly referred to as a communication unit.

A broadcast receiving module 111 receives a broadcast signal and/or broadcast associated information from an external broadcast managing entity via a broadcast channel. The broadcast channel may include a satellite channel and a terrestrial channel. The broadcast managing entity generally refers to a system which transmits a broadcast signal and/or broadcast associated information.

Examples of broadcast associated information include information associated with a broadcast channel, a broadcast program, a broadcast service provider, etc. For example, the broadcast associated information may include an electronic program guide (EPG) of digital multimedia broadcasting (DMB) and electronic service guide (ESG) of digital video broadcast-handheld (DVB-H).

The broadcast signal may be implemented, for example, as a TV broadcast signal, a radio broadcast signal, and a data broadcast signal. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. If desired, data received by the broadcast receiving module 111 may be stored in a suitable device, such as a memory 160.

A mobile communication module 112 communicates wireless signals with one or more network entities such as a base station or Node-B. Such signals may represent, for example, audio, video, multimedia, control signaling, and data.

A wireless internet module 113 supports Internet access for the mobile terminal 100. This module may be internally or externally coupled to the mobile terminal 100. Suitable technologies for wireless internet may include, but are not limited to, WLAN (Wireless LAN) (Wi-Fi), Wibro (Wireless broadband), Wimax (World Interoperability for Microwave Access), and HSDPA (High Speed Downlink Packet Access). The wireless internet module may be replaced with a wire internet module in non-mobile terminals. The wireless internet module 113 and wire internet module may be commonly referred to as an internet module.

A short-range communication module 114 facilitates relatively short-range communications. Suitable technologies for short-range communication my include, but are not limited to, radio frequency identification (RFID), infrared data association (IrDA), ultra-wideband (UWB), as well as the networking technologies commonly referred to as Bluetooth™ and ZigBee™.

A position-location module 115 identifies or otherwise obtains the location of the mobile terminal 100. This module may be implemented using, for example, global positioning system (GPS) components which cooperate with associated satellites, network components, and combinations thereof. According to the current technology, the GPS module 115 is able to precisely calculate current 3-dimensional position information based on longitude, latitude and altitude by calculating distance information and precise time information from at least three satellites and then applying triangulation to the calculated information. Currently, location and time information are calculated using three satellites, and errors of the calculated location position and time information are then amended using a fourth satellite. In addition, the GPS module 115 is able to calculate speed information by continuously calculating a real-time current location.

An audio/video (A/V) input unit 120 is configured to provide audio or video signal input to the mobile terminal 100. As shown, the A/V input unit 120 includes a camera 121 and a microphone 122. The camera 121 receives and processes still or video image frames.

A microphone 122 receives an external audio signal while the portable device is in a particular mode, such as phone call mode, recording mode or voice recognition mode. This audio signal is processed and converted into digital data.

The portable device, and specifically the A/N input unit 120, typically includes noise removing algorithms to remove noise generated in the course of receiving the external audio signal. Data generated by the A/N input unit 120 may be stored in the memory 160, utilized by the output unit 150, or transmitted via one or more modules of communication unit 110. If desired, two or more microphones and/or cameras may be used.

A user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a display, which will be described in more detail below.

A sensing unit 140 provides status measurements of various aspects of the mobile terminal 100. For example, the sensing unit may detect an open or close status of the mobile terminal 100, relative positioning of components such as a display and keypad of the mobile terminal, a change of position of the mobile terminal or a component of the mobile terminal, a presence or absence of user contact with the mobile terminal, orientation or acceleration/deceleration of the mobile terminal.

If the mobile terminal 100 is configured as a slide-type mobile terminal, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

An interface unit 170 is often implemented to couple the mobile terminal with external devices. Typical external devices include wired/wireless headphones, external chargers, power supplies, storage devices configured to store data such as audio, video, and pictures, as well as earphones and microphones. The interface unit 170 may be configured using a wired/wireless data port, audio input/output ports, video input/output port, a card socket for coupling to a memory card, a subscriber identity module (SIM) card, a user identity module (UIM) card, or removable user identity module (RUIM) card).

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power may operate as a signal enabling the mobile terminal 100 to recognize that it is correctly loaded in the cradle.

An output unit 150 generally includes various components that support the output requirements of the mobile terminal 100. A display 151 is typically implemented to visually display information associated with the mobile terminal 100. For example, if the mobile terminal 100 is operating in a phone call mode, the display will generally provide a user interface or graphical user interface that includes information associated with placing, conducting, and terminating a phone call.

As another example, if the mobile terminal 100 is in a video call mode or a photographing mode, the display 151 may additionally or alternatively display images associated with these modes.

One particular implementation includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display. The mobile terminal 100 may include one or more of displays 151. An example of a two-display embodiment is one in which one display 151 is configured as an internal display viewable when the terminal is in an opened position and a second display 151 configured as an external display viewable in both the open and closed positions.

The touch screen may be configured to detect a touch input pressure as well as a touch input position and size.

A proximity sensor (not shown in the drawing) may be provided within or around the touch screen. The proximity sensor detects an object approaching a prescribed detecting surface without mechanical contact. The proximity sensor is superior to a contact sensor in lifespan and utilization.

The proximity sensor is explained as follows. If an object approaches a sensor detecting surface while an oscillation circuit provides a sine radio frequency, the amplitude of the oscillation circuit may be attenuated. This attenuation is converted to an electric signal detecting a presence of the object. If any material except metallic material comes between the RF oscillation proximity sensor and the object, a proximity switch is able to detect the object to detect without interference from the material.

If the touch screen is electrostatic, the touch screen may be configured to detect the proximity of a pointer using an electric field change attributed to the proximity of the pointer.

Approaching the touch screen with the pointer not being contacting the touch screen is referred to as "proximity touch" and bringing the pointer into contact with the touch screen is referred to as "contact touch" in the following description. A proximity touch point of the pointer on the touch screen means a point of the touch screen to which the pointer corresponds perpendicularly to the touch screen when the pointer proximity-touches the touch screen.

The proximity sensor senses proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern may be displayed on the touch screen.

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

The audio output module 152 functions in various modes such as call-receiving mode, call-placing mode, recording mode, voice recognition mode and broadcast reception mode. During operation, the audio output module 152 outputs audio relating to a particular function or status, such as call received, message received, or errors.

The output unit 150 is further shown having an alarm 153, which is commonly used to signal or otherwise identify the occurrence of a particular event associated with the mobile terminal 100. Typical events include call received, message received and user input received.

An example of a signal provided by the output unit 150 is tactile sensations. For example, the alarm 153 may be configured to vibrate responsive to the mobile terminal 100 receiving a call or message. As another example, vibration is provided by the alarm 153 responsive to receiving user input at the mobile terminal 100, thereby providing a tactile feedback mechanism. It is understood that the various signals provided by the components of output unit 150 may be separately performed or performed using any combination of such components.

A memory 160 is generally used to store various types of data to support the processing, control, and storage requirements of the mobile terminal 100. Examples of such data include program instructions for applications operating on the mobile terminal 100, contact data, phonebook data, messages, pictures, and video.

Moreover, data for various patterns of vibration and/or sound outputted in case of a touch input to the touch screen may be stored in the memory 160.

As map information may be stored in the memory 160, convenience may be further provided in a manner of providing the map information if necessary. Moreover, a recent use history or a cumulative use frequency of each menu in the mobile terminal may be stored in the memory 160.

The memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

A controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touch screen as characters or images, respectively.

A power supply 190 provides power required by the various components for the mobile terminal 100. The power may be internal power, external power, or combinations thereof.

Various embodiments may be implemented in computer software, hardware, or some combination thereof. For a hardware implementation, the embodiments may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments may be implemented with separate software modules, such as procedures and functions, each of which perform one or more of the functions and operations described herein. The software codes may be implemented with a software application written in any suitable programming language and may be stored in memory such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However such teachings apply equally to other types of mobile terminals.

Figure 2:
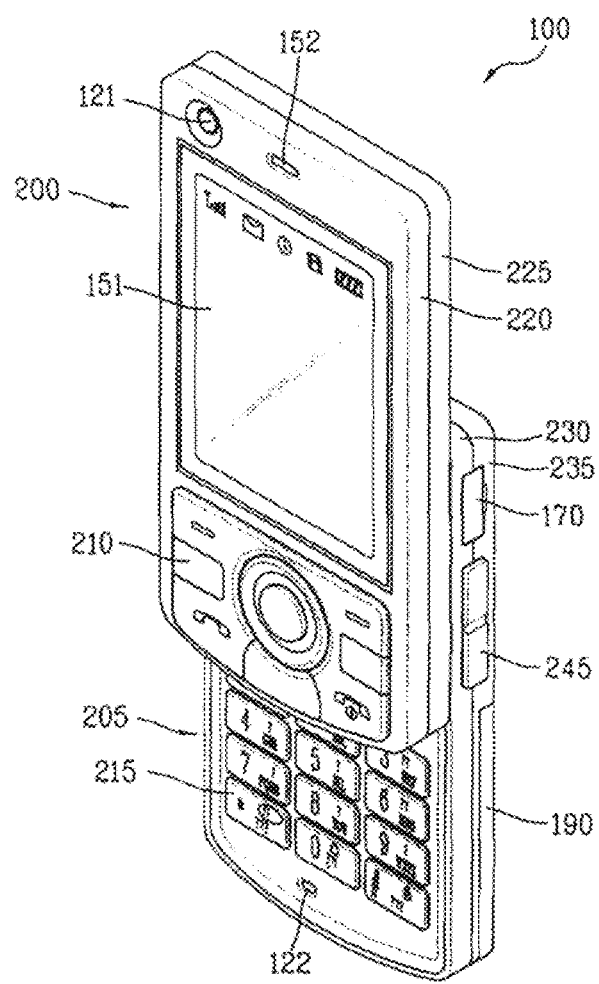
FIG. 2 is a perspective diagram of a front side of a mobile terminal according to an embodiment of the present invention.

FIG. 2 is a perspective view of a front side of a mobile terminal 100 according to an embodiment of the present invention. In FIG. 2, the mobile terminal 100 is shown having a first body 200 configured to slidably cooperate with a second body 205.

The user input unit 130 described in FIG. 1 may include a first input unit such as function keys and four directional keys 210, a second input unit such as keypad 215 and a third input unit such as side keys 245. The function keys 210 are associated with the first body 200, and the keypad 215 is associated with the second body 205. The keypad includes various keys such as numbers, characters, and symbols to enable a user to place a call, prepare a text or multimedia message, and otherwise operate the mobile terminal 100.

The first body 200 slides relative to the second body 205 between open and closed positions. Although not shown in drawings, in case of a folder-type mobile terminal, a first body thereof folds and unfolds relative to a second body thereof between open and closed positions. In addition, in case of a swing-type mobile terminal, a first body thereof swings relative to a second body thereof between open and closed positions.

In a closed position, the first body 200 is positioned over the second body 205 in such a manner that the keypad 215 is substantially or completely obscured by the first body 200. In the open position, user access to the keypad 215 is possible. The function keys 210 are conveniently configured for a user to enter commands such as start, stop and scroll.

The mobile terminal 100 is operable in either a standby mode, in which it is able to receive a call or message and to receive and respond to network control signaling or an active call mode. Typically, the mobile terminal 100 functions in the standby mode in the closed position and in an active mode in the open position. This mode configuration may be changed as required or desired.

The first body 200 is shown formed from a first case 220 and a second case 225. The second body 205 is shown formed from a first case 230 and a second case 235. The first case 230 and second case 235 are usually formed from a suitably rigid material, such as injection molded plastic, or formed using metallic material, such as stainless steel (STS) and titanium (Ti).

One or more intermediate cases may be provided between the first case 230 and second case 235 of one or both of the first body 200 and second body 205. The first body 200 and second body 205 are typically sized to receive electronic components necessary to support operation of the mobile terminal 100.

The first body 200 is shown having a camera 121 and audio output unit 152, which is configured as a speaker, positioned relative to the display 151. The camera 121 may be constructed such that it may be selectively positioned relative to first body 200 such as by rotation or, swiveling.

The function keys 210 are positioned adjacent to a lower side of the display 151, which is shown implemented as an LCD or OLED. The display may also be configured as a touch screen having an underlying touchpad which generates signals responsive to user contact with the touch screen, such as with a finger or stylus.

The second body 205 is shown having a microphone 122 positioned adjacent to the keypad 215 and having side keys 245, which are one type of a user input unit as mentioned above, positioned along the side of second body 205. Preferably, the side keys 245 may be configured as hot keys, such that the side keys are associated with a particular function of the mobile terminal 100. An interface unit 170 is shown positioned adjacent to the side keys 245, and a power supply 190 in a form of a battery is shown located on a lower portion of the second body 205.

Figure 3:
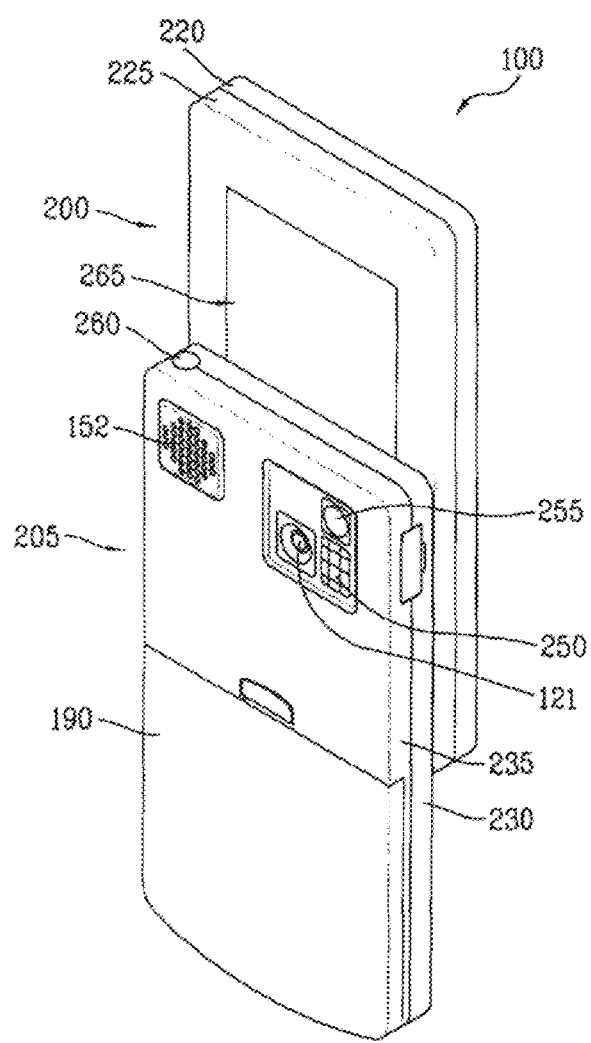
FIG. 3 is a perspective diagram of a backside of the mobile terminal shown in FIG. 2.

FIG. 3 is a rear view of the mobile terminal 100 shown in FIG. 2. FIG. 3 shows the second body 205 having a camera 121 with an associated flash 250 and mirror 255. The flash 250 operates in conjunction with the camera 121. The mirror 255 is useful for assisting a user to position the camera 121 in a self-portrait mode.

The camera 121 of the second body 205 faces a direction which is opposite to a direction faced by the camera 121 of the first body 200 (FIG. 2). Each of the cameras 121 of the first body 200 and second body 205 may have the same or different capabilities.

In an embodiment, the camera 121 of the first body 200 operates with a relatively lower resolution than the camera 121 of the second body 205. Such an arrangement works well during a video conference, for example, in which reverse link bandwidth capabilities may be limited. The relatively higher resolution of the camera 121 of the second body 205 (FIG. 3) is useful for obtaining higher quality pictures for later use or for communicating with other parties.

The second body 205 also includes an audio output module 152 located on an upper side of the second body and configured as a speaker. The audio output modules 152 of the first body 200 and second body 205 may cooperate to provide stereo output. Moreover, either or both of these audio output modules 152 may be configured to operate as a speakerphone.

A broadcast signal receiving antenna 260 is shown located at an upper end of the second body 205. The antenna 260 functions in cooperation with the broadcast receiving module 111 (FIG. 1). The antenna 260 may be fixed or configured to retract into the second body 205. The rear side of the first body 200 includes a slide module 265, which slidably couples with a corresponding slide module located on the front side of the second body 205.

It is understood that the illustrated arrangement of the various components of the first body 200 and second body 205 may be modified as required or desired. In general, some or all of the components of one body may alternatively be implemented on the other body. In addition, the location and relative positioning of such components are not critical to many embodiments, and therefore, the components may be positioned at locations which differ from those shown by the representative figures.

The mobile terminal 100 of FIGS. 1-3 may be configured to operate within a communication system which transmits data via frames or packets, including both wireless and wired communication systems, and satellite-based communication systems. Such communication systems utilize different air interfaces and/or physical layers.

Examples of air interfaces utilized by the communication systems include example, frequency division multiple access (FDMA), time division multiple access (TDMA), code division multiple access (CDMA), the universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
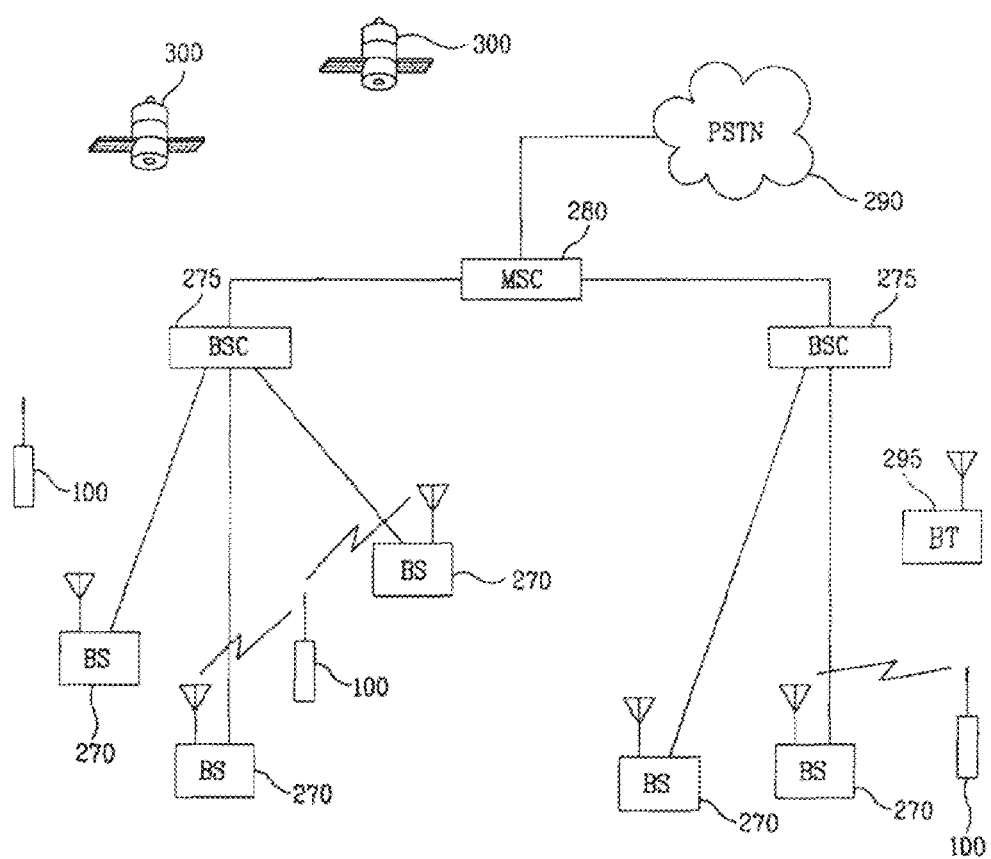
FIG. 4 is a block diagram of a wireless communication system having a mobile terminal according to the present invention.

Referring to FIG. 4, a CDMA wireless communication system is shown having a plurality of mobile terminals 100, a plurality of base stations 270, a plurality of base station controllers (BSCs) 275, and a mobile switching center (MSC) 280.

The MSC 280 is configured to interface with a conventional public switch telephone network (PSTN) 290. The MSC 280 is also configured to interface with the BSCs 275.

The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations 270 may also be denoted as "cell sites." Alternatively, individual sectors of a given base station 270 may be referred to as cell sites.

A terrestrial digital multimedia broadcasting (DMB) transmitter 295 is shown broadcasting to mobile terminals 100 operating within the system. The broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 4 further depicts several global positioning system (GPS) satellites 300. Such satellites facilitate locating the position of some or all of the mobile terminals 100. Two satellites are depicted, but it is understood that useful positioning information may be obtained with greater or fewer satellites.

The position-location module 115 (FIG. 1) of the mobile terminal 100 is typically configured to cooperate with the satellites 300 to obtain desired position information. It is to be appreciated that other types of position detection technology, such as location technology that may be used in addition to or instead of GPS location technology, may alternatively be implemented. Some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 engage in calls, messaging, and other communications.

Each reverse-link signal received by a given base station 270 is processed within that base station 270. The resulting data is forwarded to an associated BSC 275.

The BSC 275 provides call resource allocation and mobility management functionality including soft handoffs between the base stations 270. The BSCs 275 also route the received data to the MSC 280, which provides additional routing services for interfacing with the PSTN 290.

Similarly, the PSTN interfaces with the MSC 280, and the MSC 280 interfaces with the BSCs 275. The BSCs 275 control the base stations 270 to transmit sets of forward-link signals to the mobile terminals 100.

In the following description, a control method applicable to the above-configured mobile terminal 100 is explained with respect to various embodiments. It is understood that the following embodiments may be implemented independently or through combinations thereof.

If the display module 151 includes a touch screen, the following embodiments may be implemented more easily. Hereinafter, a display screen of the touch screen 151 shall be indicated by a reference number 400.

First Embodiment

Figure 5:
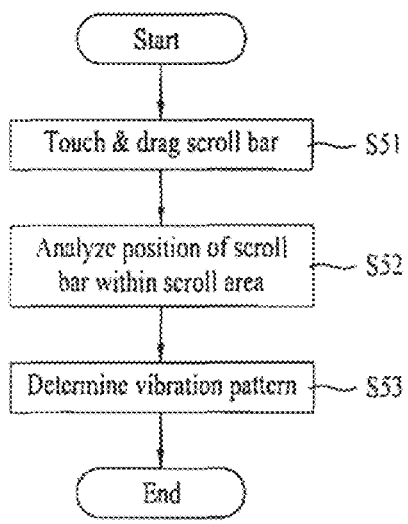
FIG. 5 is a flowchart for a method of controlling a mobile terminal according to a first embodiment of the present invention.

A method of controlling a mobile terminal according to a first embodiment of the present invention is explained with reference to FIGS. 5 to 7 as follows. FIG. 5 shows a method of controlling a mobile terminal according to a first embodiment of the present invention, and FIG. 6 and FIG. 7 are show a display screen on which a method of controlling a mobile terminal according to a first embodiment of the present invention is implemented.

Figure 6:
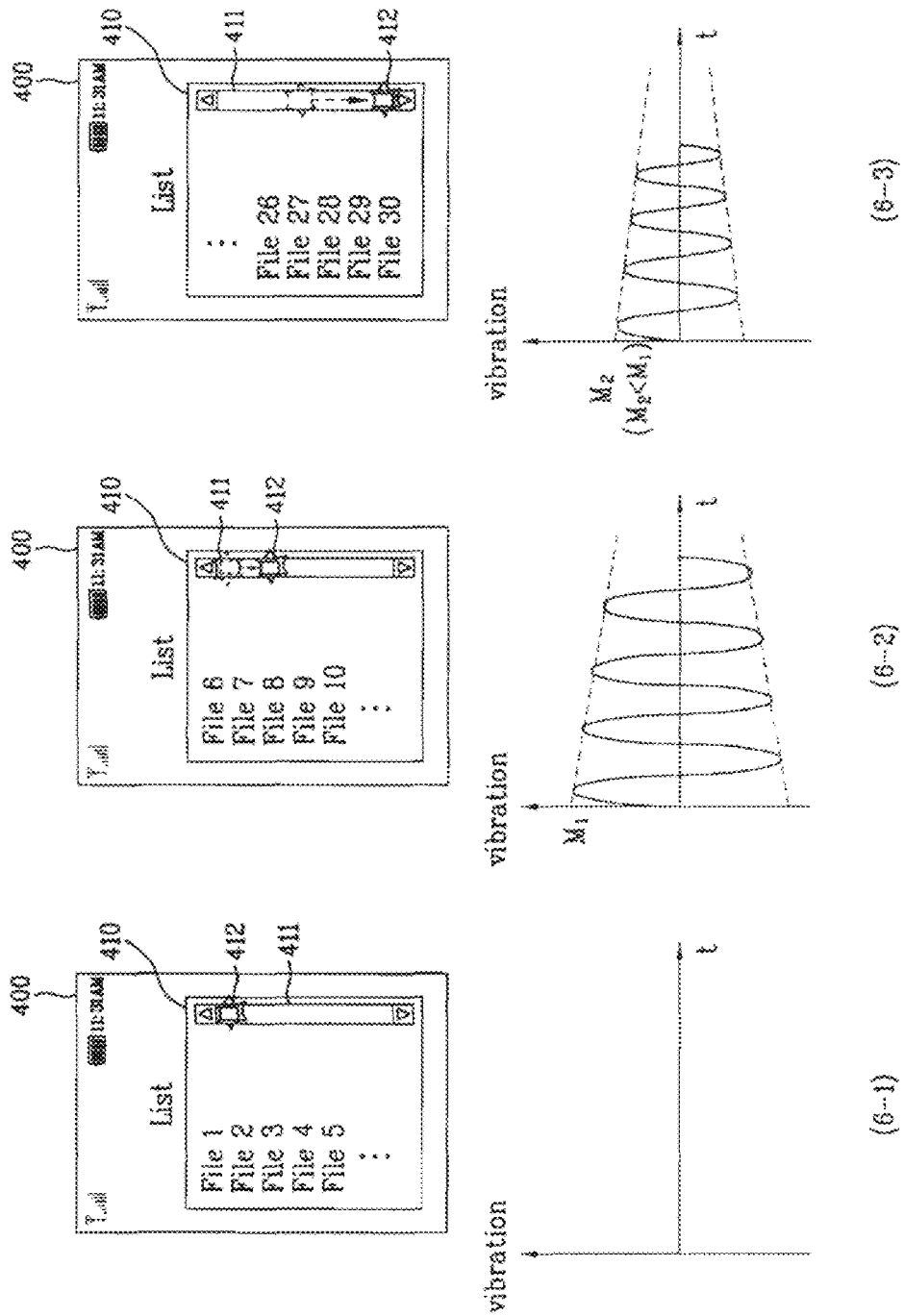
FIG. 6 and FIG. 7 are display screens of a terminal on which a method of controlling a mobile terminal according to the first embodiment of the present invention is implemented.
Figure 7:
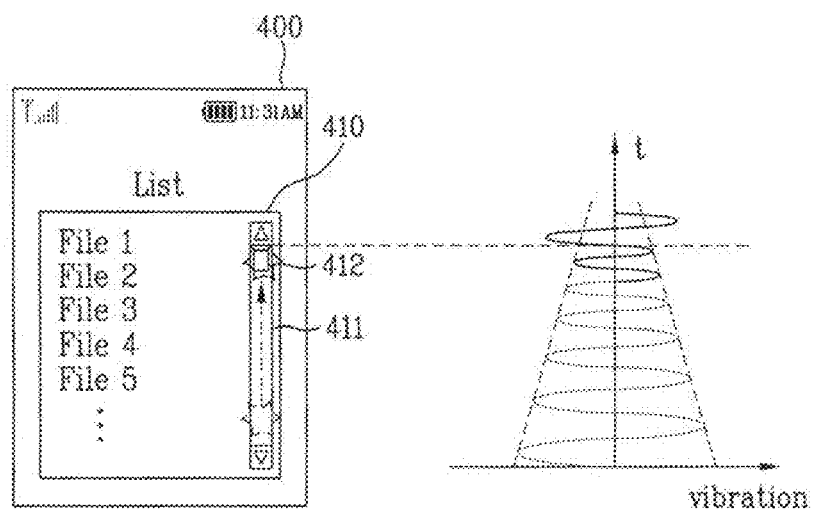

Referring to (6-1) of FIG. 6, a list 410 is displayed on the touch screen 400 that may be one of an e-mail list, a message list, a file list, a phone call record list, a website bulletin board list, and the like.

A scroll bar 412 is provided in a scroll area 411 with the list 410. When the scroll bar 412 is touched and scrolled top to bottom, files not displayed within the list 410 become displayed when the scroll bar 412 is moved. This is explained in detail as follows.

When the scroll bar 412 is located in a top end portion of the scroll area 411, and touched by a pointer (e.g., finger, stylus pen, etc.), the terminal 100 may be configured not to generate vibration when the touch screen is initially touched, as illustrated by the graph shown in (6-1) of FIG. 6.

Referring to (6-2) of FIG. 6, subsequently when the scroll bar 412 is dragged in a bottom direction [S51] of FIG. 5, vibration is generated by the mobile terminal 100 facilitating the recognition that the scroll bar 412 is touched and scrolled.

When the scroll bar 412 is scrolled, the controller determines the position of the scroll bar 412 within the scroll area 411 [S52] and the controller 180 controls a pattern of the vibration to vary gradually or discretely according to the position of the scroll bar 412 [S53].

As shown in (6-2) of FIG. 6, when the scroll bar 412 is scrolled from the top end portion of the scroll area 411 to bottom, vibration magnitude varies according to the position of the scroll bar 412 and as the scroll bar 412 is scrolled gradually, the magnitude of the vibration diminishes.

Referring to (6-3) of FIG. 6, when the scroll bar 412 is located in the middle portion of the scroll area 411 and is touched and scrolled down, the initial vibration magnitude is smaller than that in (6-2) of FIG. 6. As the scroll bar 412 is scrolled down to the end of the scroll area 411, the vibration magnitude diminishes to be negligible or disappears completely.

When the scroll bar 412 reaches the top or bottom of the scroll area 411, the terminal 100 may be configured to produce a vibration pattern announcing the end of the scroll area 411. This feature is explained in detail with reference to FIG. 7 as follows.

In FIG. 7, the scroll bar 412 having been located in the bottom of the scroll area 411 is touched and then scrolled to the top of the scroll area 411. As the scroll bar 412 is touched and scrolled to the top, the corresponding vibration magnitude is attenuated gradually. When the scroll bar 412 reaches the top of the scroll bar 412, the vibration magnitude is increased temporarily (or instantaneously) enabling the recognition that the scroll bar 412 has reached the end of the top of the scroll area 411.

As an alternative to or in addition to changing the vibration magnitude according to the position of the scroll bar 412 within the scroll area 411, the frequency of the vibration may also be varied. Changing the vibration frequency is applicable to the following embodiments as well.

In the foregoing description, the pattern of the vibration is adjusted according to the position of the scroll bar. By non-limiting examples for the present embodiment, the pattern of the vibration may be controlled according to a position of the scroll bar 412.

Second Embodiment

Figure 8:
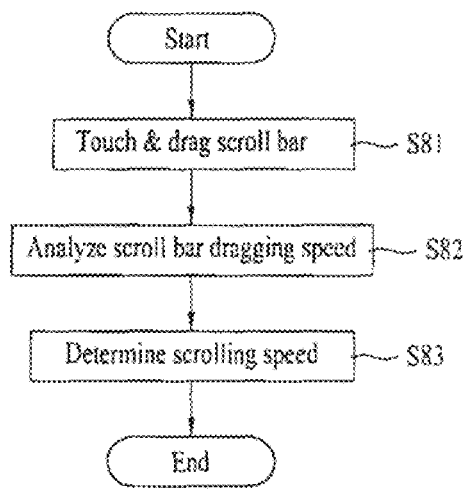
FIG. 8 is a flowchart for a method of controlling a mobile terminal according to a second embodiment of the present invention.

A method of controlling a mobile terminal according to a second embodiment of the present invention is explained with reference to FIGS. 8 to 10 as follows. FIG. 8 is a flowchart for a method of controlling a mobile terminal according to a second embodiment of the present invention, and FIG. 9 and FIG. 10 are diagrams of a display screen on which a method of controlling a mobile terminal according to the second embodiment of the present invention is implemented.

Figure 9:
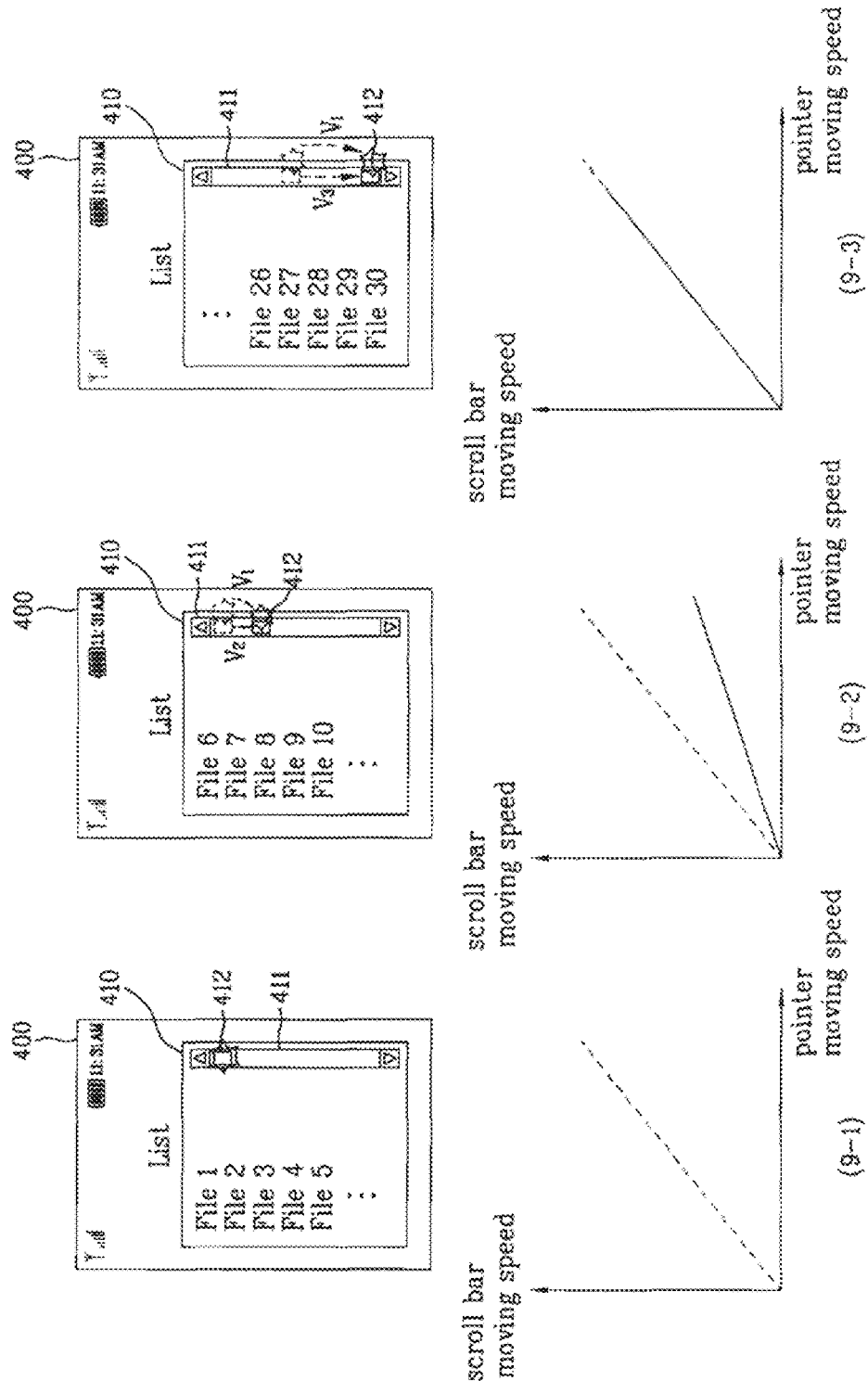
FIG. 9 and FIG. 10 are display screens of a mobile terminal having a second embodiment of the present invention.
Figure 10:
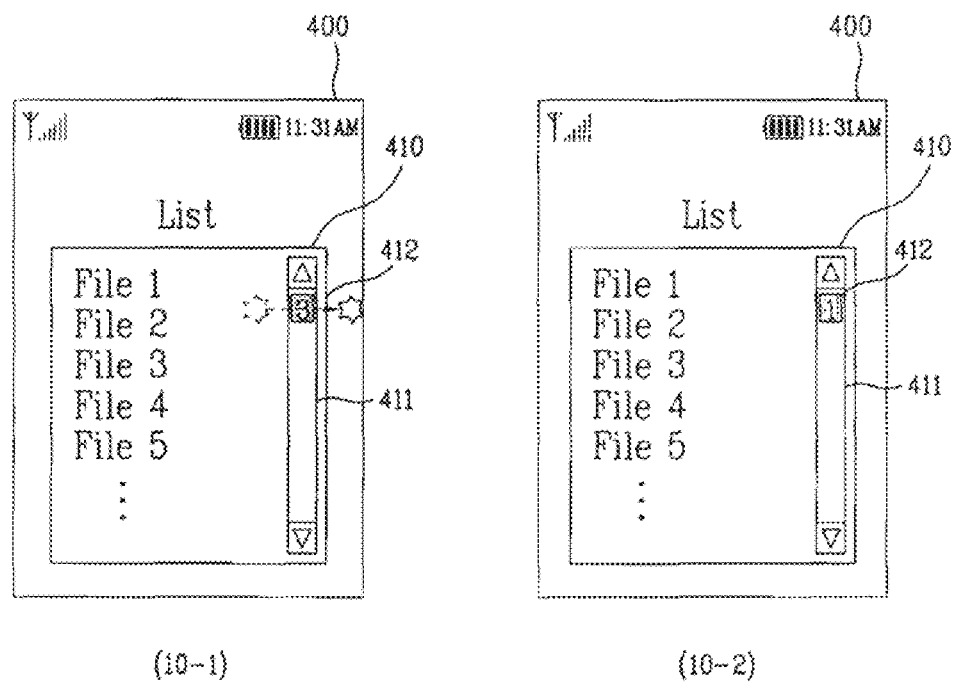

Referring to (9-1) of FIG. 9, a list 410 is displayed on the touch screen 400 that may be one of an e-mail list, a message list, a file list, a phone call record list, a website bulletin board list, and the like.

A scroll bar 412 is provided in a scroll area 411 with the list 410. When the scroll bar 412 is touched and scrolled top to bottom, files not displayed within the list 410 become displayed when the scroll bar 412 is moved.

Referring to (9-2) of FIG. 9, the scroll bar 412 is touched by a pointer and dragged down direction at a first speed $v_1$ [S81]. The scroll bar 412 moves at a different speed $v_2$, which differs from the first speed $v_1$ according to the current position of the scroll bar 412 within the scroll area 411 and the position of the pointer. The speed of the scroll bar 412, $v_2$, is slower than the speed of dragging the pointer, $v_1$, such that it appears the scroll bar is following the pointer.

The speed of the scroll bar 412, v2, may be adjusted to be slower than the speed the pointer is dragged, v1, in proportion to the distance from the pointer to the 22 current position of the scroll bar 412. In other words, the greater the distance between the pointer and the current position of the scroll bar 412, the slower the speed of the scroll bar 412, v2. As shown in (9-3) of FIG. 9, as the scroll bar 412 approaches the position of the pointer, the speed of the scroll bar 412, v3, while still less than that the dragged speed of the pointer, v1, approaches that of v1.

When the scroll bar 412 is touched and scrolled by the pointer, the moving speed of the scrolled scroll bar 412 is affected by the distance between the pointer and the current position of the scroll bar 412. The speed difference between the dragged pointer and the scroll bar 412 may be adjusted, and this adjustment is explained in detail with reference to FIG. 10.

As previously described, a scroll area 411 extending in a vertical direction is provided with the file list 400 and a scroll bar 412 in the scroll area 411 for scrolling the files within the scroll area 411.

An indication of the extent of influence on the speed of the scroll bar 412 may be represented by a number displayed on the scroll bar 412. The higher the number, the greater the influence the distance between the pointer and the current position of the scroll bar 412 has on the speed of the scroll bar 412.

Referring to (10-1) of FIG. 10, the scroll bar 412 may be indicated by a thumb wheel having an indicator number, and the number is adjusted by touching and rotating the thumb wheel in a left or right direction. Namely, the scroll bar 412 is touched and rotated in a direction different from the direction of the scroll area 411. Referring to (10-2) of FIG. 10, the number '3' the indicator of the scroll bar 412 is changed into the number '1' for example. The extent of the influence caused on the moving speed of the scroll bar 412 is smaller than that represented by (10-1) of FIG. 10.

If the indicator on the scroll bar 412 is '0', the speed of the scroll bar 412 is not affected by the file number at all. This means that the speed of the pointer is the same as the speed of the scroll bar 412.

When the scroll bar 412 is touched and dragged by the pointer, the speed of the scrolled scroll bar 412 is proportional to the distance between the pointer and the current position of the scroll bar 412. The speed of the scroll bar 412 also may be inversely proportional to the distance between the pointer and the current position of the scroll bar 412

The speed control of the scroll bar 412 may be implemented together with or separate from the vibration generation according to the first embodiment of the present invention.

Third Embodiment

Figure 11:
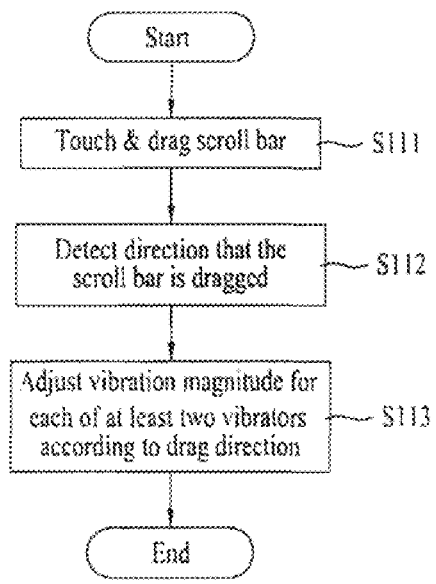
FIG. 11 is a flowchart for a method of controlling a mobile terminal according to a third embodiment of the present invention.

A method of controlling a mobile terminal according to a third embodiment of the present invention is explained with reference to FIGS. 11 to 13 as follows. FIG. 11 is a flowchart for a method of controlling a mobile terminal according to a third embodiment of the present invention, and FIG. 12 and FIG. 13 are diagrams of a display screen on which a method of controlling a mobile terminal according to a third embodiment of the present invention is implemented.

Figure 12:
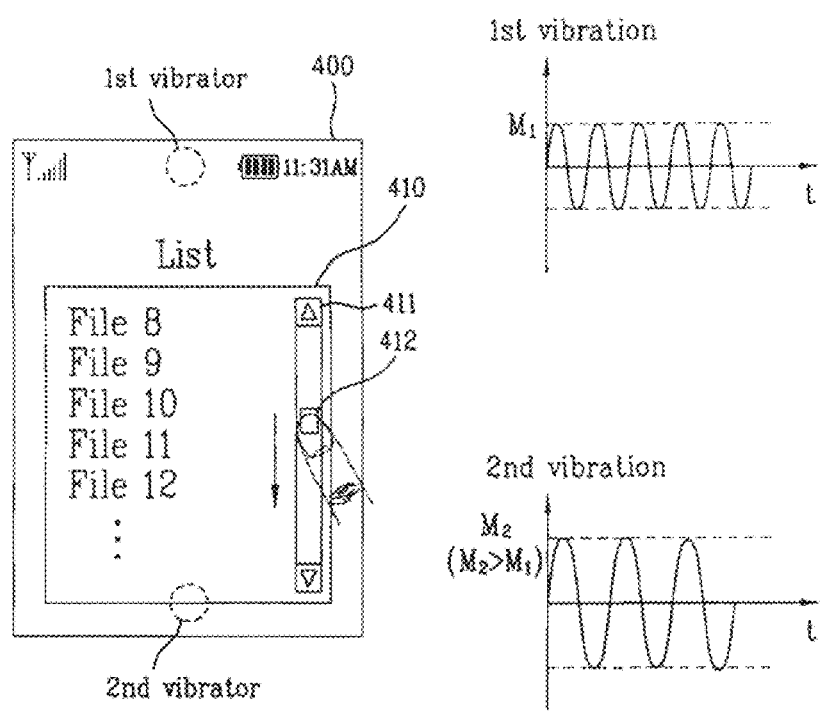
FIG. 12 and FIG. 13 are display screens of a mobile terminal having a third embodiment of the present invention.
Figure 13:
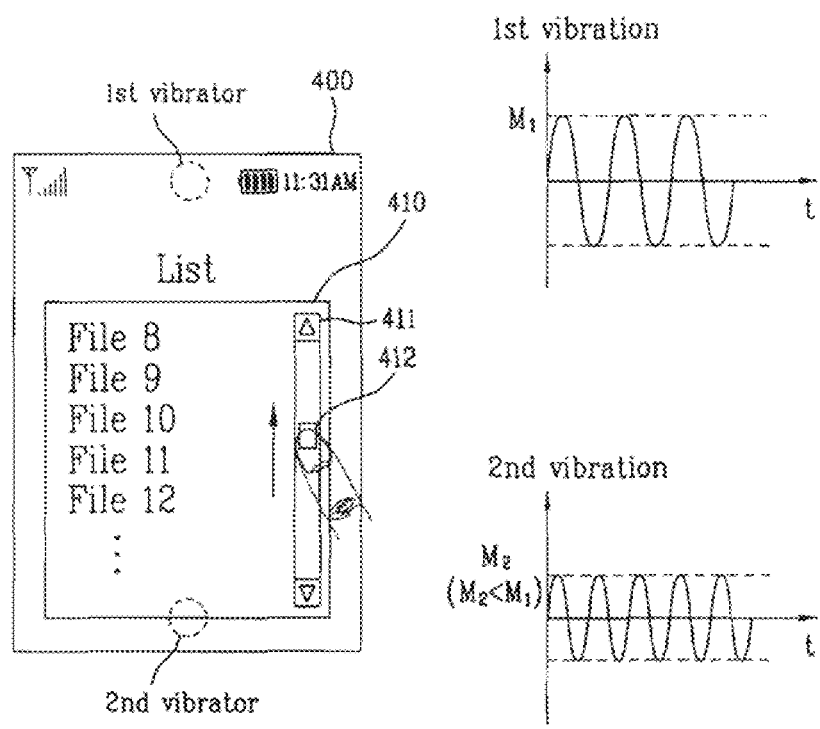

Referring to FIG. 12, a first vibrator is provided on, for example, a top portion of the back of the touch screen 400 and a second vibrator is provided on a bottom portion of the back of the touch screen 400. The first and second vibrators may provide vibrations to the touch screen 400 if the touch screen 400 is touched. In the following description, the vibration generated by the first vibrator is a first vibration and the vibration generated by the second vibrator is a second vibration. It is understood that two or more vibrators may be provided to the touch screen 400.

Referring to FIG. 12, a file list 410 is displayed on the touch screen 400. As mentioned in the foregoing description, a scroll area 411 extending vertically is provided to the file list 400 and a scroll bar 412 for scrolling files exist within the scroll area 411. The scroll bar 412 is touched and dragged in a bottom direction [S11]. The controller 180 detects that the scroll bar 412 is dragged in a downward direction [S112].

The controller 180 controls a magnitude $M_2$ of the vibrator located in the drag direction (i.e., the downward direction) to be greater than a magnitude $M_1$ of the first vibrator [S113].

When dragging the scroll bar 412 in the upward direction, the controller 180 controls the first vibrator to produce a vibration $M_1$ greater than the vibration $M_2$ produced by the second vibrator. Therefore, the terminal is able to produce a vibration according to the direction that the scroll bar 412 is scrolled.

Fourth Embodiment

FIGS. 14 to 19 are diagrams of a display screen on which a method of controlling a mobile terminal according to a fourth embodiment of the present invention is implemented.

Scrolling a file list is explained with reference to FIG. 14. A file list 410 is displayed on the touch screen 400. A scroll area 411 extending in a horizontal direction is provided on the file list 410. And, a scroll bar 412 is provided within the scroll area to be scrolled in a left-to-right direction.

Figure 14:
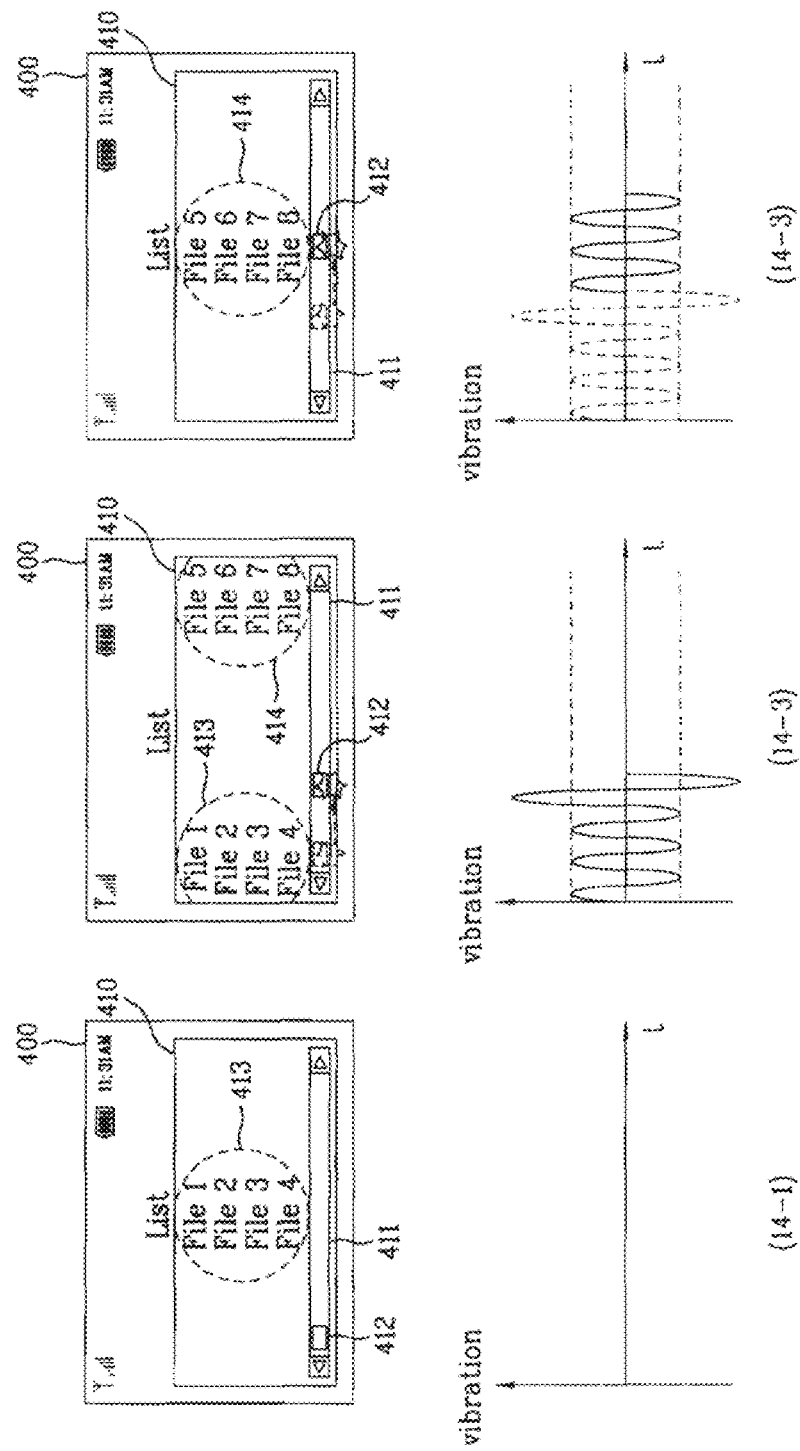

A first group of files corresponding to a position of the scroll bar 412 is displayed on the file list 400 in FIG. 14-1. As shown in FIG. 14-2, the scroll bar 412 is touched and then dragged left to right. In doing so, a vibration is generated from the mobile terminal 100 according to the scroll. As mentioned in the foregoing description, the magnitude of the vibration may gradually decrease according to a progress of the scroll. Alternatively, the magnitude of the vibration may be fixed for the duration of the scroll.

As the scroll proceeds, the files belonging to the first group are scrolled off the display screen and are no longer displayed as a second group of files appears. At a point when both of the first and second groups of the files are simultaneously displayed or when only the second group of the files is displayed, the mobile terminal 100 generates a vibration pulse of a greater magnitude to indicate that the second group of the files has been displayed.

Alternatively, if vibration is not generated during the scrolling, a vibration pulse may be generated when both of the first and second groups of the files are simultaneously displayed, or when only the second group of the files is displayed.

Displaying a webpage using Internet access in the mobile terminal is explained with reference to FIG. 15. A browser window 420 is displayed on the touch screen 400 and a webpage is displayed in the webpage window 420. A first scroll area 421 extending vertically and a first scroll bar 422 are also displayed. A second scroll area 423 extending horizontally and a second scroll bar 424 also are displayed. The first and the second scroll bars, 422 and 424, may be simultaneously or independently operated to scroll a webpage within the browser window.

Figure 15:
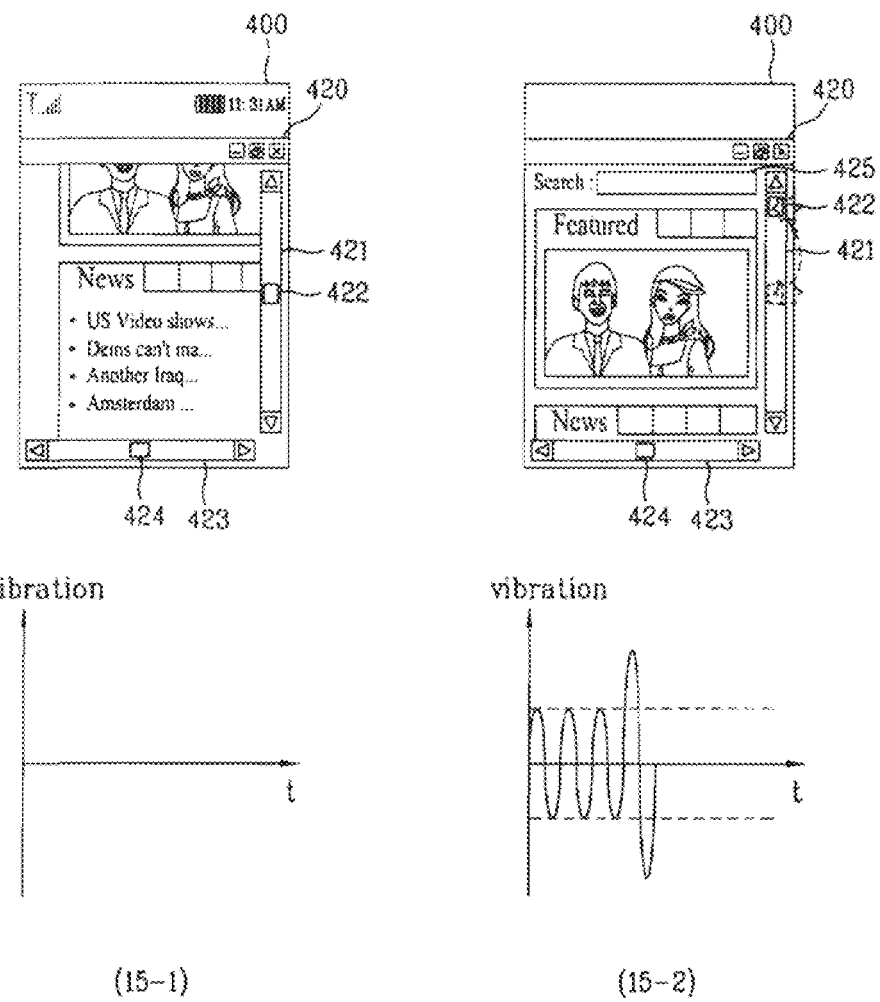

In FIG. 15-2, as the first scroll bar 422 is touched and dragged in an upward direction, the webpage is scrolled towards top and a vibration is generated from the mobile terminal 100 according to the scroll. As the webpage is scrolled and displayed, the vibration magnitude is decreased gradually. Alternatively, the vibration magnitude remains constant.

As the scroll proceeds, a text input box 425 on the webpage is displayed as shown in FIG. 15.2. The mobile terminal 100 generates a vibration pulse having a greater magnitude indicating announce that the text input box 425 is fully displayed.

The terminal 100 may be configured to generate the vibration pulse when the text box 425 is initially displayed or when the text box 425 is displayed in a particular position in the browser window, i.e., in the center portion of the browser window.

The terminal 100 also may be configured to generate the vibration pulse when a link is displayed, when a specific keyword is displayed, or when an icon indication a specific function (a "logon" icon for example) is displayed. These examples are presented as non-limiting examples.

Another example of displaying a webpage using an Internet access in the mobile terminal is explained with reference to FIG. 16. As the scroll bar 422 is scrolled, a bulletin board may be displayed within the browser window 420 wherein various bulletins having hit counts are displayed. The terminal may generate a vibration with a magnitude corresponding to the magnitude of the hit counts of the various bulletins when a bulletin is scrolled to a specific area on the webpage display. Alternatively, the vibration magnitude may vary with a file type, an importance of a bulletin or file, or such.

Reproducing a multimedia file in the mobile terminal 100 is explained with reference to FIG. 17. A multimedia file play window 430 is displayed on the touch screen 400. A reproduction progress bar 432 is displayed in the multimedia file play window 430 to indicate the reproduction progress of the multimedia file.

Figure 17:
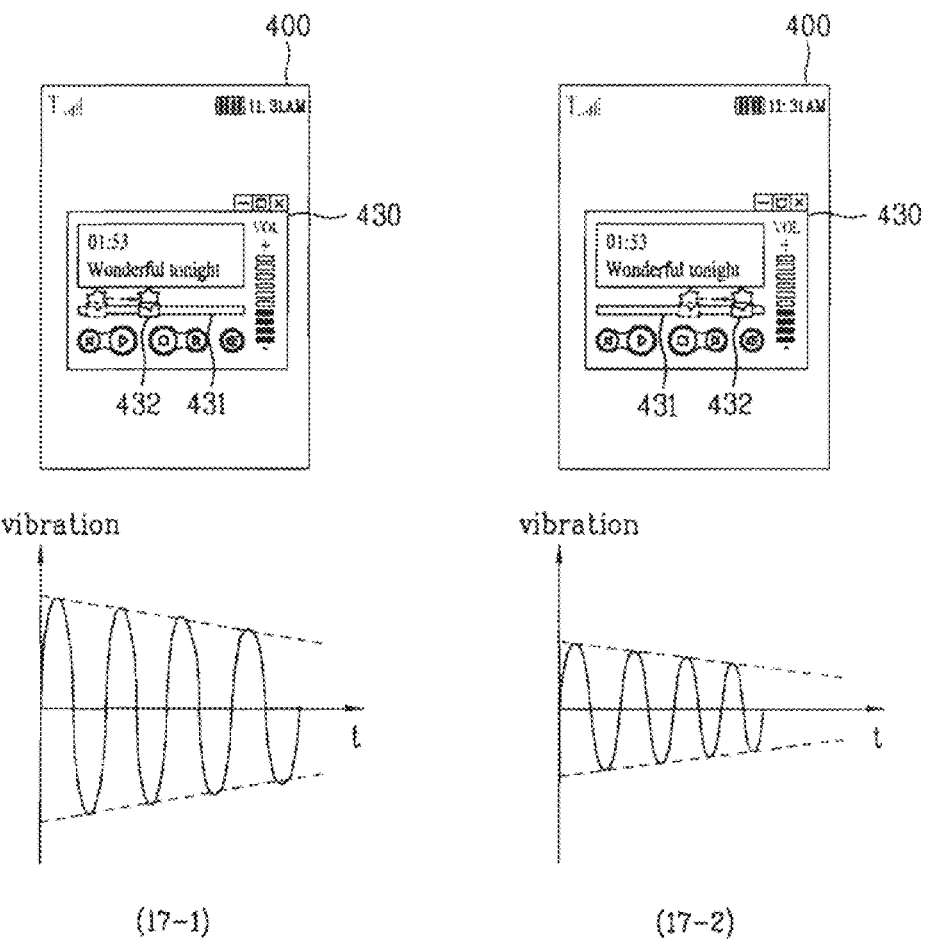

Referring to (17-1) and (17-2) of FIG. 17, when the reproduction progress bar is touched and scrolled, the terminal 100 generates a vibration having a magnitude according to the reproduction progress of the multimedia file.

Alternatively, a vibration pulse having a greater magnitude is generated when the reproduction progress bar is scrolled to a predetermined play section (e.g., a repeat section) in the reproduction progress bar or when the reproduction progress bar is scrolled from a start or end of the reproduction progress bar.

Figure 18:
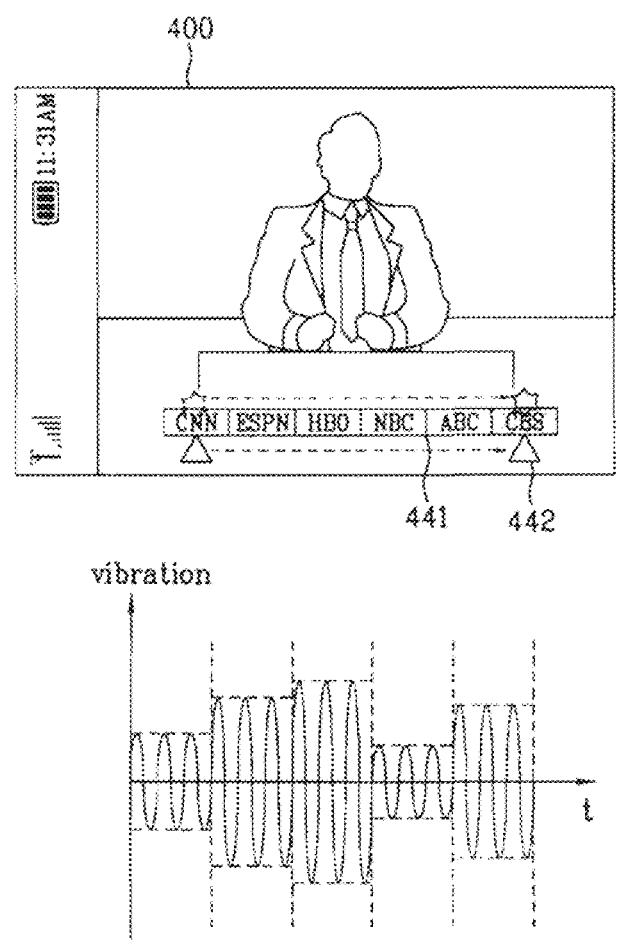

Receiving and displaying a broadcast in the mobile terminal 100 is explained with reference to FIG. 18. A received broadcast is displayed on the touch screen 400, and a channel selection area 441 for selecting a broadcast channel is also displayed on the touch screen 400. The channel selection area 441 is divided into predetermined sections with a channel is assigned to each of the sections. A selection bar 442 is provided to the channel selection area 441 to select a channel. A broadcast channel corresponding to the section, at which the selection bar 442 is located, is selected.

When the selection bar 442 is touched and dragged, a vibration is generated whose magnitude is according to the reception strength of the broadcast channel corresponding to the location on the selection bar 442.

Displaying a preview image for capturing a video or a still image in the mobile terminal 100 is explained with reference to FIG. 19. A preview image for image capturing is displayed on the touch screen 400. A zoom area 451 for adjusting the magnification of the preview image by a scroll action is displayed on the touch screen 400, and a zoom bar 452 is provided to the zoom area 451.

When the zoom bar 452 is touched and dragged for zoom adjustment, a vibration is generated wherein the vibration magnitude varies according to the degree of zoom.

Accordingly, the present invention provides the following advantages.

First, when a prescribed command is provided to a touch screen of a terminal, the present invention enables the recognition that the prescribed command is being correctly provided.

Secondly, when a pointer is touched and dragged on a touch screen of a terminal, the present invention enables a vibration having a different pattern to be generated suitable for different conditions, thereby enabling a tactile sensation that the pointer is being touched and moved.

It will be apparent to those skilled in the art that various modifications and variations may be made in the present invention without departing from the spirit or scope of the inventions.

Thus, it is intended that the present invention covers the modifications and variations of this invention provided they come within the scope of the appended claims and their equivalents.

What is claimed is:
1. A terminal comprising:
   a touch screen display configured to display a scroll bar in
      a scroll area extending in a first direction such that the scroll bar is movable along the scroll area in the first direction; and
   a controller configured to:
      adjust a first moving speed of the scroll bar to be same as or slower than a second moving speed of a pointer in response to a touch-dragging input received at the scroll bar in a second direction that is substantially perpendicular to the first direction;
      cause the touch screen display to display, on the scroll bar, number information indicating the adjusted first moving speed;
      cause the scroll bar to move at the adjusted first moving speed according to movement of the pointer on the touch screen display; and
      decrease the adjusted first moving speed according to a distance from the pointer to a current position of the scroll bar when the distance increases.

2. The terminal of claim 1, wherein a position of a portion of scrollable content displayed on a display screen of the touch screen display is indicated by a position of the scroll bar.

3. The terminal of claim 2, wherein the controller is further configured to control the touch screen display to change the position of the displayed portion of the scrollable content at the adjusted first moving speed according to the position of the scroll bar that is changed by being moved at the adjusted first moving speed.

4. The terminal of claim 1, further comprising a vibrator configured to generate vibration, wherein the controller is further configured to control the vibrator to change the vibration.

5. The terminal of claim 1, wherein the controller is further configured to cause the touch screen display to display the movement of the scroll bar being scrolled such that the scroll bar appears to follow the pointer moving on the touch screen display.

6. The terminal of claim 5, wherein the number information is changed in response to a second touch-dragging input received at the scroll bar in the second direction.

7. The terminal of claim 5, wherein the controller is further configured to change a degree of effect of the movement of the pointer on the first moving speed of the scroll bar in response to the touch-dragging input such that a ratio of the first moving speed and the second moving speed changes when the degree of effect is changed.

8. The terminal of claim 1, wherein the controller is further configured to change the first moving speed of the scroll bar from a first speed to a second speed in response to the touch-dragging input.

9. The terminal of claim 8, wherein the second speed, which is slower than the first speed, is slower than the second moving speed of the pointer.

10. The terminal of claim 1, wherein:
   the number information comprises a numeric value corresponding to the adjusted first moving speed; and
   the scroll bar is moved at the adjusted first moving speed while the pointer is moved at the second moving speed that is consistent, the changed first moving speed being different from the second moving speed.

11. The terminal of claim 1, wherein the controller is further configured to cause the touch screen display to display the number information at a designated location of the scroll bar.

12. A terminal comprising:
   a wireless communication unit;
   a touch screen display configured to display a scroll bar in
      a scroll area extending in a first direction such that the scroll bar is movable along the scroll area in the first direction; and a controller configured to:
- cause the touch screen display to display the scroll bar scrolled in response to dragging a pointer in the first direction, the pointer being in contact with the touch screen display;
- adjust a scroll speed of the scroll bar to be same as or slower than a dragging speed of the pointer in response to a touch-dragging input received at the scroll bar in a second direction that is substantially perpendicular to the first direction;
- cause the touch screen display to display, on the scroll bar, number information indicating the adjusted scroll speed; and
- decrease the adjusted scroll speed according to a distance from the pointer to a current position of the scroll bar when the distance increases.

13. The terminal of claim 12, wherein:
- adjusting the scroll speed comprises decreasing the scroll speed; and
- the controller is further configured to control the touch screen display such that the scroll bar appears to move slower than the pointer.

14. A method of controlling a terminal, the method comprising:
- displaying, via a touch screen display, a scroll bar in a scroll area extending in a first direction such that the scroll bar is movable along the scroll area in the first direction;
- adjusting a first moving speed of the scroll bar to be same as or slower than a second moving speed of a pointer in response to a touch-dragging input received at the scroll bar in a second direction that is substantially perpendicular to the first direction;
- displaying, on the scroll bar, number information indicating the adjusted first moving speed;
- causing the scroll bar to move at the adjusted first moving speed according to movement of the pointer on the touch screen display; and
- decreasing the adjusted first moving speed according to a distance from the pointer to a current position of the scroll bar when the distance increases.

15. The method of claim 14, further comprising:
indicating a position of a portion of scrollable content displayed on a display screen of the touch screen display by a position of the scroll bar.

16. The method of claim 15, further comprising:
changing the position of the displayed portion of the scrollable content at the adjusted first moving speed according to the position of the scroll bar that is changed by being moved at the adjusted first moving speed.

17. The method of claim 14, further comprising:
generating vibration via a vibrator; and
controlling the vibrator to change the vibration.

18. The method of claim 14, further comprising:
displaying the movement of the scroll bar such that the scroll bar appears to follow the pointer moving on the touch screen display.

19. The method of claim 18, further comprising:
changing a degree of effect of the movement of the pointer on the first moving speed of the scroll bar in response to the touch-dragging input such that a ratio of the first moving speed and the second moving speed changes when the degree of effect is changed.

20. The method of claim 14, wherein the adjusted first moving speed is decreased when the distance increases in response to the movement of the pointer that is contact with the scroll bar to drag the scroll bar.

21. The method of claim 14, further comprising:
changing the first moving speed of the scroll bar from a first speed to a second speed in response to the touch-dragging input.

22. The method of claim 21, wherein the second speed, which is slower than the first speed, is slower than the second moving speed of the pointer.

23. The method of claim 14, wherein:
the number information comprises a numeric value corresponding to the adjusted first moving speed; and
the scroll bar is moved at the adjusted first moving speed while the pointer is moved at the second moving speed that is consistent.

24. The method of claim 14, wherein the adjusted first moving speed is decreased in proportion to the distance when the distance increases.

25. A method of controlling a terminal, the method comprising:
- displaying, via a touch screen display, a scroll bar in a scroll area extending in a first direction such that the scroll bar is movable along the scroll area in the first direction;
- displaying the scroll bar scrolled in response to dragging a pointer in the first direction, the pointer being in contact with the touch screen display;
- adjusting a scroll speed of the scroll bar to be same as or slower than a dragging speed of the pointer in response to a touch-dragging input received at the scroll bar in a second direction that is substantially perpendicular to the first direction;
- displaying, on the scroll bar, number information indicating the adjusted scroll speed; and
- decreasing the adjusted scroll speed according to a distance from the pointer to a current position of the scroll bar when the distance increases.

26. The method of claim 25, wherein adjusting the scroll speed comprises decreasing the scroll speed such that the scroll bar appears to move slower than the pointer on the touch screen display.

* * * * *